Feb. 22, 1966     E. A. BERLUCCHI     3,237,182
FAIL-SAFE INDICATOR
Filed Dec. 6, 1963     2 Sheets-Sheet 1
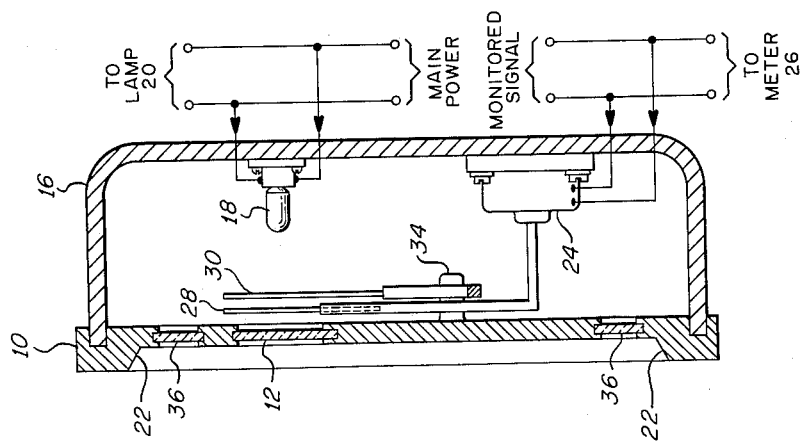
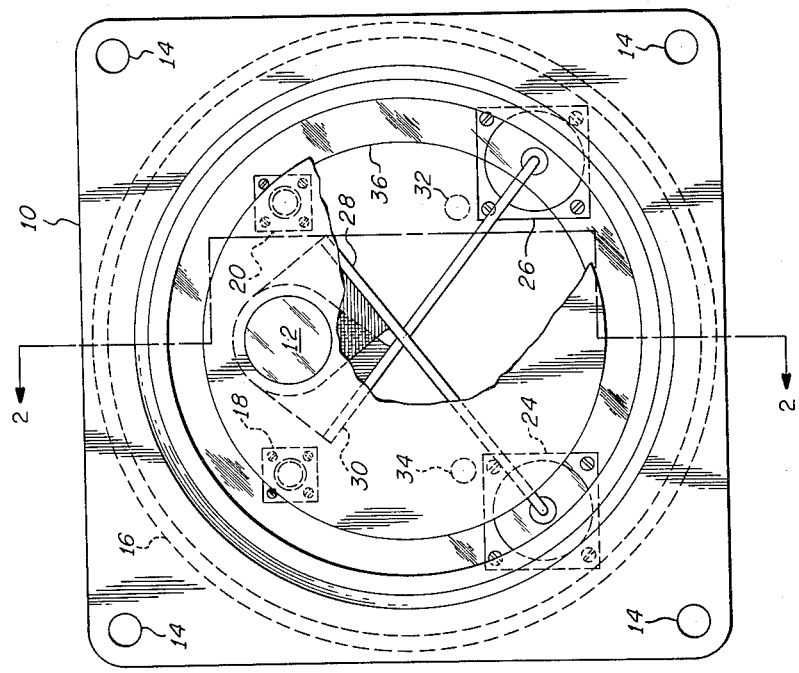
INVENTOR.
ERNEST A. BERLUCCHI
BY
ATTORNEY Feb. 22, 1966 E. A. BERLUCCHI 3,237,182
FAIL-SAFE INDICATOR
Filed Dec. 6, 1963 2 Sheets-Sheet 2
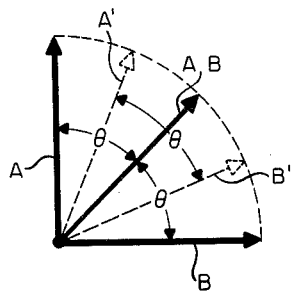
FIG. 3.
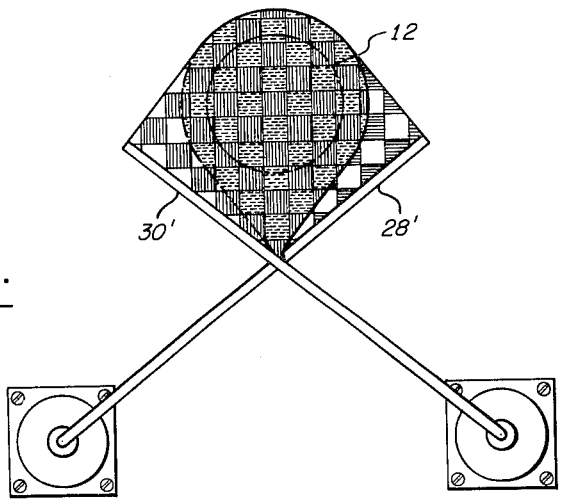
FIG. 4.
FIG. 5.
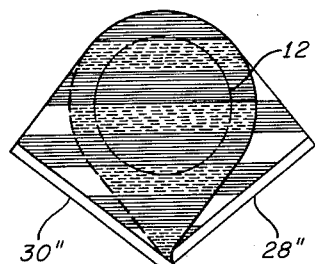
INVENTOR.
ERNEST A. BERLUCCHI
BY
*S.C.Seaton*
ATTORNEY

United States Patent Office 3,237,182
Patented Feb. 22, 1966

3,237,182
FAIL-SAFE INDICATOR
Ernest A. Berlucchi, Bethpage, N.Y., assignor to Sperry Rand Corporation, Great Neck, N.Y., a corporation of Delaware
Filed Dec. 6, 1963, Ser. No. 328,619
7 Claims. (Cl. 340—266)

This invention relates in general to indicators and more particularly to indicators adapted to show with great assurance the presence or failure of an applied control signal, being also of such a nature that any failure within the indicator itself is quite easily determined and located.

Prior art signal failure indicators, e.g. as shown in U.S. Patent 2,671,208, usually each employ a meter movement which is adapted to receive a control signal to be monitored. The meter movement in response then to its received signal drives generally a small warning flag, or the like, out of view and, on interruption of the control signal, the flag falls back into view to indicate signal failure. Certain problems are associated with this type of failure indicator: First, a warning flag is usually not very alarming since it is in most cases only painted (with as bright a warning color, e.g. red, as possible), and therefore does not ordinarily alert a viewer to a failure at the instant that it occurs. This can be catastrophic for example in the operation of an aircraft. Second, the meter movement may "stick" and thereby keep the flag from view even when there is a signal failure, such being again an obviously dangerous condition when the indicator is used in an aircraft. And third, the meter movement may "stick" so that the warning flag is in view when in actuality there really is no signal failure.

A rather obvious modification to the above-described warning indicator will result in elimination of the first-mentioned problem above, viz. use the meter driven flag to cover (or not) a warning lens or the like which is adapted to be illuminated by an auxiliary relatively high powered light source. For the second and third problems, the corrective measure immediately suggested is to employ redundant meter driven flags which simultaneously cooperate to cover (or not) the lens to be illuminated. However, such measure introduces new problems absent when only one meter driven flag is employed. These are: In the event either one of the meter movements sticks to keep its flag covering the illuminable lens, the indicator will absolutely never show a failure of the signal being monitored. Also, were either meter movement to stick so as to have its respective flag not cover the illuminable lens, one would never know that there had been a partial failure of the indicator itself.

The present invention overcomes each and every one of the above-mentioned problems, and does so exactly in the manner noted except for just one small modification, viz. the flags are so arranged that only when both flags cover the lens is light prevented from illuminating the lens. When only one flag covers the lens, approximately one half the light which would normally reach the lens is blocked by the covering flag.

In a presently preferred form of the invention, a light-polarizing sheet material such as that shown in U.S. Patent 1,918,848 is used for both flags, the material of one flag being oriented to pass vertically polarized light when it covers the lens, and the material of the other flag being oriented to pass horizontally polarized light when that flag covers the lens. Behind the lens are preferably at least a pair of lamps connected in parallel and adapted to illuminate it; and preferably near or surrounding the lens is a light transmissive medium continually being illuminated by the lamps.

Now, assuming both meter movements are operative, application of a control signal to the indicator causes the flags to move to cover the lens. Since both flags cooperate with each other in contributing toward totally blocking light from reaching the lens, the indicator does not indicate a signal failure. However, because light is free to pass through the light transmissive medium, the failure indicator indicates that it is at least partially operative. Interruption now of the control signal causes both flags to fall away from the lens causing the lens to "glow" in warning. Hence, the first above-mentioned problem of prior art indicators is overcome.

Now, assume one meter movement sticks so as to cover the lens. Still, on signal failure the other movement will cause its flag to fall away from the lens, thereby permitting light to reach and pass through the lens. Here, the viewer will at least be immediately made aware of some malfunction. However, since the "glow" above mentioned is halved (approximately) by the stuck flag, interpretation may be made to locate the problem area or areas. By examining both the failure warning indicator and the operation of the control apparatus, failures can here be isolated to both the indicator and the control signal. Conversely, should one meter movement stick so as to prevent one flag from covering the lens, the lens will glow continually at the reduced level even when a control signal is received, and on interruption of such signal will glow appreciably, thereby isolating the problem here to the indicator itself.

Should neither meter movement stick but the glow of the lens be reduced anyway, the level of the control signal may be determined to be the source of the problem. This is because the flags in response to low level signals both partially fall out of their oppositely polarizing alignment to permit some light to reach the lens. This will be discussed in more detail later.

The invention may be employed to monitor by means of a single instrument, a pair of control signals both of which are necessary for proper performance of a certain operation.

A principal object of the invention is to provide a signal failure warning indicator which checks not only on the application of a control signal but on the operation of the indicator itself.

Another object of the invention is to provide a failure warning indicator that provides warning indications with great assurance.

Another object of the invention is to provide a signal failure indicator that employs a pair of warning flags that cooperate with each other to indicate signal failures and indicator failures.

The invention will be described with reference to the figures wherein:

FIG. 1 is a front view of an indicator employing the invention,

FIG. 2 is a side view taken along line 2—2 of FIG. 1, being partially schematic in nature, FIG. 3 is a diagram useful in showing a feature of the invention, FIGS. 4 and 5 depict modifications which may be made to elements of the apparatus of FIGS. 1 and 2 to provide additional forms of the invention.

Referring to FIGS. 1 and 2, a front plate 10 is provided with a lens 12 which is preferably of an alarming color such as red. The front plate 10, which is provided with mounting holes 14, serves as a cover for a housing 16. The housing 16 contains lamps 18 and 20 which are adapted to illuminate the lens 12. The front plate 10 is provided with a circular recess 22. Secured within the housing 16 are meter movements 24 and 26 which support extended flags 28 and 30. On receipt of applied signals, the meter movements 24 and 26 are adapted to counter-rotate to move their respective flags 28 and 30 to the positions shown in FIG. 1. Bosses 32 and 34 are secured to the backside of the front plate 10 and serve to support the flags 28 and 30 respectively when the meter movements 24 and 26 do not receive control signals. A light transmissive medium 36, serving as a second lens, surrounds the lens 12 and is adapted to be completely out of the way of the meter driven flags 28 and 30. Therefore, the medium 36 is adapted to be continually illuminated by the lamps 18 and 20.

In this, the presently preferred embodiment of the invention, the flags 28 and 30 comprise a light-polarizing material. In the positions that the flags are depicted in, the flag 28 is adapted to pass horizontally polarized light and the flag 30 is adapted to pass vertically polarized light. As shown in FIG. 2, the lamps 18 and 20 are adapted to be electrically connected in parallel to provide assurance for the continual illumination of the lenses 12 and 36. The meter movements 24 and 26 similarly are adapted to receive control signals electrically in parallel so that failure of one meter movement will not disturb operation of the other.

FIG. 3 shows how the indicator of FIGS. 1 and 2 may be employed to indicate a problem associated with the level of the control signal applied to the meter movements 24 and 26. When both meter driven flags are positioned as shown in FIG. 1, their respective polarizations may be represented as shown by the FIG. 3 vectors A and B, with the resultant or combined ability of the flags to block light from the lamps 18 and 20 being representative of the total angle between the vectors, to wit $2\theta$. When one meter movement becomes inoperative, say stuck so that its flag does not intercept light from the lamps, the resultant light blockage will be reduced to be proportional to the angle $\theta$. That is, when either meter movement causes its respective flag to fall away from the lens 12, its polarization representative vector will be as shown by the vector AB. Therefore, assuming both meter movements 24 and 26 are operative, but the signals applied to them are, for example, halved the flag 28 will fall partially so that its polarization representative vector is as shown by the vector A', and the polarization vector B for the flag 30 will be as shown by the vector B'. Note here that the angle, representing the light blockage qualities of the cooperating flags, is $\theta$, an angle which is exactly half that which it ought to be. In other words, the indicator may, by taking consideration of all other factors, e.g. operation of control apparatus and operability of the meter movements themselves, provide an indication of the level of the signals applied to the indicator.

Obviously, many modifications may be made to the above-described apparatus while still practicing the herein-described invention. For example, instead of counter-rotating the flags 28 and 30, as is done, they may be rotated in the same direction with the only requirement being that the flags, when they are positioned to intercept light from the lamps, cooperate to prevent light from reaching the lens. In such embodiment, however, since there is no counter-rotating of the flag vectors A and B, as indicated by FIG. 3, there will likewise be no representation as to control signal level. Also, obviously more than two lamps may be employed, and instead of applying the same signal in parallel to the two separate meter movements, different signals may be applied to respective meter movements. Then, only when both signals are present will the warning lens 12 be prevented from glowing. Further, light-polarizing material need not comprise the makeup of the flags 28 and 39 and, rather, the flags may take the forms shown in FIGS. 4 and 5. In FIG. 4 each flag 28' and 30' is provided with a checkerboard grating and is so arranged that when the flags are elevated to cover the lens 12, light is prevented from reaching the lens. In FIG. 5 the flags 28'' and 30'' take a different form of grating and similarly block light from the lens 12 only when they are elevated by control signals.

While the invention has been described in is preferred embodiments, it is to be understood that the words which have been used are words of description rather than of limitation and that changes within the purview of the appended claims may be made without departing from the true scope and spirit of the invention in its broader aspects.

What is claimed is:

1. A signal failure indicator comprising light means, lens means, a pair of meter movements each adapted to receive an electrical control signal, a pair of flags each adapted to be positioned respectively by one of said meter movements, said meter movements in response to said control signals being adapted to move said flags with respect to said lens means to intercept and prevent said light means light from reaching said lens means, said flags being each arranged with respect to the other to prevent substantially all light from reaching said lens only when both said meter movements receive applied signals of a certain level.

2. The apparatus of claim 1 wherein each meter movement rotatably moves its respective flag about a different axis.

3. The apparatus of claim 1 wherein each meter movement counter-rotates its respective flag with respect to the other flag.

4. The apparatus of claim 1 including second lens means adapted to receive continually the light from said light means.

5. The apparatus of claim 1 wherein said flags are made of a light-polarizing material.

6. A signal failure monitor comprising a housing, a lens supported by said housing, first and second meter movements supported within said housing and adapted to receive respective control signals, first and second flags secured respectively to and adapted to be moved by each of said movements, lamp means so supported within said housing that light may shine toward said lens, said meter movements being further adapted to counter-rotate their respective flags about substantially parallel axes, whereby the flags may intercept the light from said lamp means when their respective meter movements receive control signals, said flags being each so arranged that only when both intercept the light from said lamp is said lens substantially not illuminated.

7. A signal failure monitor comprising a housing, a first lens supported by said housing, first and second meter movements supported within said housing and adapted to receive respective control signals, first and second flags secured respectively to and adapted to be moved by each of said movements, lamp means so supported within said housing that light may shine toward said first lens, said meter movements being further adapted to counter-rotate their respective flags about substantially parallel axes, whereby the flags may intercept the light from said lamp means when their respective meter movements receive control signals, said flags being of a light-polarizing material and being each so secured respectively to its meter movement that only when both intercept the light from said lamp means is said first lens not illuminated, and a second lens supported by said housing and adapted to be illuminated continually by said lamp means.

References Cited by the Examiner

UNITED STATES PATENTS

| | | | |
|---|---|---|---|
| 2,191,730 | 2/1940 | Sjostrand | 340—24 X |
| 2,395,718 | 2/1946 | Bradley | 88—65 X |
| 2,915,936 | 12/1959 | Winchell | 88—65 X |

NEIL C. READ, *Primary Examiner.*